United States Patent Office 3,432,479
Patented Mar. 11, 1969

3,432,479
REACTION PRODUCT OF MONOAMINE, POLYAMINE AND POLYMER OF A MONOVINYL MONOMER AND MALEIC ANHYDRIDE
Joseph A. Verdol, Dolton, and Donald J. Carrow, Markham, Ill., assignors to Sinclair Research, Inc., New York, N.Y., a corporation of Delaware
No Drawing. Original application Oct. 7, 1965, Ser. No. 493,921, now Patent No. 3,365,399, dated Mar. 26, 1968. Divided and this application Sept. 18, 1967, Ser. No. 671,884
U.S. Cl. 260—78.5                                6 Claims
Int. Cl. C10m 1/36; C08f 27/08

ABSTRACT OF THE DISCLOSURE

There are disclosed reaction products of monoamine and polyamine with a polymer resin of a monovinyl compound such as styrene, and maleic anhydride. The monoamine may be, for instance, octadecylamine or hexadecylamine, while the polyamine may be, for instance, diethylaminopropylamine, diethylenetriamine or tetraethylenepentamine. The reaction products are oil-soluble and exhibit detergent properties when included in a base lubricating oil.

---

This application is a division of application Ser. No. 493,921, filed Oct. 7, 1965, now Patent No. 3,365,399.

This invention relates to the reaction products of a monoamine and a polyamine with a polymer resin of a monovinyl compound and maleic anhydride, which reaction products have particular utility as detergents and antioxidants in lubricating oils.

The use of metallic detergents in internal combustion engine lubricating oil compositions is well known, particular utility for these detergents being found in lubricating oil compositions which are subjected to heavy duty service resulting in the oxidation of the oil with the resultant formation of sludge and varnish. Although these detergents such as metallic petroleum sulfonates have been very useful in maintaining sludge and varnish suspended in the oil, they have the disadvantage of being themselves subject to breakdown and deterioration resulting in the formation of a metallic ash which accumulates in the combustion chamber of the engine. Another drawback of many metallic detergents is that they lack sufficient basicity to effectively counteract the deleterious acidic materials commonly found in lubricating oils.

Nor have these metallic detergents proven effective in dispersing the "blow-by" contamination of the lubricating oil when the engine is operated in light service and at low operating temperatures. When the engine is cold the cylinder walls act as a condenser for the fuel vapors and combustion products in the cylinder. These contaminants wash past or "blow-by" the piston rings into the crankcase wherein they tend to emulsify and coagulate causing insoluble sludge deposits which the usual metallic detergents are unable to redisperse. To overcome these "blow-by" contaminants and to disperse the sludge deposits in the crankcase, attempts have been made to provide ashless dispersants which will prove effective at the low operating temperatures found in light service internal combustion engines.

It has now been found that the addition to a base oil of lubricating viscosity of small, effective amounts of the base oil-soluble reaction product of a monoamine and certain polyamines with a polymer resin of a monovinyl compound of 2 to 12 carbon atoms and maleic anhydride provides the base oil with excellent dispersant properties as well as excellent basicity by virtue of the nitrogen atoms present. In addition and contrary to most ashless-detergents of the prior art, the additive of the present invention also provides the base oil with an improved pour point and viscosity index.

The polymer resin of the vinyl compound and maleic anhydride with which the monoamine and polyamine are reacted are resinous polymers having about 1 to 4 moles, preferably about 1 to 3 moles of monovinyl compound per mole of maleic anhydride. Suitable vinyl compounds include for instance, ethylene, propylene, butylene, pentylene, hexylene, heptylene, octylene, nonylene, decylene, dodecylene, methylvinyl ether, ethylvinyl ether, butyl vinyl ether, styrene and the like. The preferred vinyl monomer is styrene. If desired, maleic acid can be used instead of a maleic anhydride in formation of the polymer resin with the vinyl monomer.

The resinous polymer reactant of the invention contains repeating vinyl compound-maleic anhydride units and preferably has an average molecular weight of at least about 400 to about 100,000 and can be higher as long as the high molecular weight polymer is soluble in the base oil. The preferred average molecular weight is about 400 to 10,000. The melting points of the lower molecular weight polymers will generally range from about 80 to 300° C. as determined by the Fisher-Johns Melting Point Apparatus. The determination of average molecular weight as used herein is made by the Thermoelectric Differential Vapor Pressure Lowering Method on a Microlab Osmometer. The polymer of the vinyl monomer and maleic anhydride can be prepared by known methods. A preferred method is by solution polymerization where the monomers are polymerized in a suitable solvent employing as a polymerization catalyst a free-radical peroxide catalyst, preferably benzoyl peroxide or dicumyl peroxide, at a temperature of about 75 to 300° C. or more. Suitable solvents include the aromatic hydrocarbon solvents, such as cumene, p-cymene, xylene, toluene, etc. The aromatic solvents may serve as chain-terminating solvents and give lower molecular weight products. Other suitable solvents are the ketones, such as methylethyl ketone, which may also be chain-terminating solvents. The preferred manner of carrying out the polymerization is by what is known in the art as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the polymers causes a heterogeneous system, the polymer layer being the heavier layer and recoverable by merely decanting the upper aromatic solvent layer and drying. On the other hand, when a ketone is the solvent, the formed polymer is usually soluble in the solvent media so that recovery of the products necessitates a solvent-stripping operation.

The monoamine reactant of the invention is a monoamine having the formula:

wherein R is a monovalent hydrocarbon radical preferably alkyl, of up to 1000 carbon atoms or more preferably 5 to 25 carbon atoms and R' is R or hydrogen. Advantageously at least one R has at least 5 carbon atoms. R can be straight or branch chained, saturated or unsaturated, aliphatic or aromatic and is preferably saturated. The preferred monoamines are the primary monoamines. Examples of suitable monoamines are 2-ethylhexylamine, n-octyl amine, decyl amine, octadecyl amine, stearyl amine, lauryl amine, N-methylstearyl amine, N-ethyloctadecyl amine, N-butyllauryl amine, and the like or mixtures thereof. The monoamine can also be substituted with groups which do not interfere with the reaction of the amino group of the amine with the anhydride or acid moiety of the resinous vinyl compound-maleic anhydride copolymer and do not otherwise unduly deleteriously affect the desired properties of the final reaction product. Illustrative of non-interfering groups are carboxyl, halo-, nitro-, etc. groups.

The polyamine reactant of the invention can be represented by the general formula:

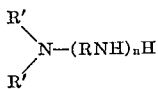

wherein R is an alkylene radical of 2 to about 25 carbon atoms, preferably 2 to 4 carbon atoms, R' is selected from H and a hydrocarbon radical, preferably alkyl, of 1 to about 25 carbon atoms and $n$ is about 1 to 10,000, more commonly 2 to 10.

These polyamines include monoalkylene diamines, dialkylaminoalkylamines and the polyalkylenepolyamines. Illustrative of suitable monoalkylene diamines are ethylene diamine, propylene butylene diamine, octylene diamine, etc.

Examples of suitable dialkylaminoalkylamines are dimethylaminomethylamine, dimethylaminoethylamine, dimethylaminopropylamine, dimethylaminobutylamine, diethylaminopropylamine, diethylaminoamylamine, dipropylaminopropylamine, methylpropylaminoamylamine, propylbutylaminoethylamine, etc.

Non-limiting examples of the polyalkylenepolyamine reactants are diethylenetriamine; triethylenetetramine; tetraethylenepentamine; polyethyleneimine; di-(methylethylene) triamine; hexapropyleneheptamine; tri(ethylethylene) tetramine; penta-(1-methylpropylene)-hexamine, tetrabutylenepentamine; etc.

The reaction product of the invention can be prepared by simply heating at elevated temperature about 0.1 to 2 moles of the total monoamine and polyamine per average anhydride unit as one carboxyl group per mole of the vinyl compound-maleic anhydride polymer. The mole ratio of monoamine to polyamine is generally about 0.1 to 10:1, preferably about 0.1 to 1:1. A temperature of about 125° C. is usually necessary to effect the reaction and temperatures beyond about 350° C. are generally not utilized in that they may cause undesirable side reactions or degradation of the product. The preferred reaction temperatures are about 190 to 280° C. The reaction may be carried out in bulk or in the presence of a suitable mutual solvent for the reactants including the lubricating oil in which the reaction product is to be employed. Although the monoamine and polyamine can be combined and reacted simultaneously with the styrene-maleic anhydride polymer, it is preferred to react one with the polymer until the reaction is substantially complete and then the other, preferably by dropwise addition. The total reaction time will vary depending upon the particular reactants employed but will usually range from about 1 to 5 hours up to several days if necessary.

The base oil into which the reaction product of the invention is incorporated can be of lubricating viscosity and can be a mineral oil or a synthetic oil. The mineral lubricating oils can be, for instance, solvent extracted or solvent refined oils obtained in accordance with conventional methods of solvent refining lubricating oils. Frequently, the viscosity of these mineral oils will be about 20 to 250 SUS at 210° F. The mineral base oil may be derived, for example, from paraffinic, naphthenic, asphaltic, or mixed base petroleum crudes and, if desired, a blend of solvent-treated Mid-Continent neutrals and Mid-Continent bright stocks may be employed.

Synthetic oils to which the reaction product may be added include ester-based synthetic oil of lubricating viscosity which consists essentially of carbon, hydrogen and oxygen, e.g., di-2-ethylhexyl sebacate. Various of these lubricating materials have been described in the literature and generally their viscosity ranges from the light to heavy oils, e.g. about 50 SUS at 100° F. to 250 SUS at 210° F. and preferably 30 to 150 SUS at 210° F. These esters are of improved thermal stability, low acid number and high flash and fire points. The complex esters, diesters, monoesters and polyesters may be used alone or to achieve the most desirable viscosity characteristics, complex esters, diesters and polyesters may be blended with each other or with naturally-occuring esters like castor oil to produce lubricating compositions of wide viscosity ranges which can be "tailor-made" to meet various specifications. This blending is performed, for example, by stirring together a quantity of diester and complex ester at an elevated temperature, altering the proportions of each component until the desired viscosity is reached.

Various useful ester base oils are disclosed in U.S. Patents Nos. 2,499,983; 2,499,984; 2,575,195; 2,575,196; 2,703,811; 2,705,724; and 2,723,286. Generally, the synthetic base oils consist essentially of carbon, hydrogen and oxygen, i.e., the essential nuclear chemical structure is formed by these elements alone. However, these oils may be substituted with other elements such as halogens, e.g., chlorine and fluorine. Some representative components of ester lubricants are ethyl palmitate, ethyl stearate, di-(2-ethylhexyl) sebacate, ethylene glycol dilaurate, di-(2-ethylhexyl) phthalate, di-(1,3-methylbutyl) adipate; di-(2-ethylbutyl) adipate, di-(1-ethylpropyl) adipate, diethyl oxylate, glycerol tri-n-acetate, di-cyclohexyl adipate, di-(undecyl) sebacate, tetraethylene glycol di-(2-ethylene hexoate), di-Cellosolve phthalate, butyl phthallylbutyl glycolate di-n-hexylfumarate polymer, dibenzyl sebacate, and diethylene glycol bis-(2-n-butoxy ethyl carbonate), 2-ethylhexyl-adipate-neopentyl glyoly-adipate-2-ethylhexyl, is a representative complex ester.

The compositions of this invention incorporate a small, minor amount of the reaction product of the invention sufficient to provide the base oil of lubricating viscosity which is the major portion of the composition with improved detergent and antioxidant properties. This amount is generally about 0.1 to 10 percent by weight or more depending on the particular base oil used and its application. The preferred concentration is about 0.2 to 5 percent by weight.

Materials normally incorporated in lubricating oils to impart special characteristics can be added to the composition of this invention. These include corrosion inhibitors, extreme pressure agents, anti-wear agents, etc. The amount of additives included in the composition usually ranges from about 0.01 weight percent up to about 20 or more weight percent, and in general they can be employed in any amounts desired as long as the composition is not unduly deleteriously affected.

The following examples are included to further illustrate the present invention.

EXAMPLE I

Preparation of mixed octadecylamine-diethylaminopropyl amine derivative of styrene-maleic anhydride resin This product was prepared using two techniques. In one case the additive was prepared in bulk and in the other case the product was prepared using a lubricating oil as the reaction medium.

(A) Into a one liter resin kettle, equipped with stirrer, nitrogen inlet, tube, thermometer, reflux condenser equipped with a Dean Stark trap, was placed 436 grams of a 95 VI mineral lubricating oil having a viscosity of 150 SUS at 100° F. and 1 mole equivalent of styrene-maleic anhydride resin (202 gms.), having a molecular weight in the range of 1600–1800 and a styrene-maleic anhydride mole ratio of 1:1, and 202 gms. (0.75 mole) of octadecyl amine. The mixture was heated to 210° C. until the imidization reaction started; then, 32.5 grams (0.25 mole) of diethylaminopropylamine was added dropwise from a dropping funnel over a period of 10 minutes. The reaction was continued until the water of reaction ceased to distill from the mixture. The total reaction time was material in a lubricating oil are shown in Table I, under 1439–63.

TABLE I

| Additive | 1% (w./v.) of additive in base oil | | | | | 2% (w./v.) of additive in base oil | | | | | 3% (w./v.) of additive in base oil | | | | |
|---|---|---|---|---|---|---|---|---|---|---|---|---|---|---|---|
| | K.V.C. 100° F. | K.V.C. 210° F. | Viscosity index | Pour point | Carbon black | K.V.C. 100° F. | K.V.C. 210° F. | Viscosity index | Pour point | Carbon black | K.V.C. 100° F. | K.V.C. 210° F. | Viscosity index | Pour point | Carbon black |
| 1439–45 | 35.72 | 5.537 | 98 | 0 | 4 | 37.02 | 5.750 | 108 | 0 | 4 | 38.48 | 6.025 | 110 | 0 | 4 |
| 1489–58 | 35.69 | 5.497 | 98 | −10 | 3 | 36.95 | 5.654 | 103 | −10 | 2 | 38.32 | 5.765 | 101 | −10 | 1 |
| 1439–63 | | 5.506 | | | 4 | | 5.640 | | | 4 | | 5.833 | | | 4 |
| 1439–25 | 38.24 | 5.666 | 96 | −10 | 3 | 38.46 | 5.910 | 106 | −5 | 3 | 40.72 | 6.192 | 109 | −5 | 4 |
| Base oil | 35.03 | 5.367 | 96 | −10 | 1 | | | | | | | | | | | approximately two hours. The product obtained was a viscous greenish liquid and was soluble in oil at all proportions. The product showed acid number $pH_{11}$ 0.32; base number $pH_4$ 4.27. The product was a greenish waxlike solid and was soluble in oil. The properties of the product in a lubricating oil are shown in Table I under 1439–45.

(B) Into a one liter resin kettle, equipped as previously described, was placed 306 grams (1 mole equivalent) of the styrene-maleic anhydride resin of A above except having a styrene to maleic anhydride mole ratio of 2:1 and 225 grams (0.75 mole) of a commercial $C_{18}$ fatty amine. The mixture was heated to 210° C. and the diethylaminopropyl amine (32.5 gms., 0.25 mole) was added dropwise over a period of ten minutes. The mixture was then heated for three hours at 210° C. The resulting product was a greenish-brown solid, which was completely soluble in oil and organic solvents. The product showed an acid number $pH_{11}$ 0.58; base number $pH_4$ 24.7; percent N, 3.09 (theory percent N, 3.1). The properties exhibited by the product in a lubricating oil are shown in Table I, under 1439–25.

EXAMPLE II

Preparation of mixed hexadecylamine and tetraethylene pentamine derivative of styrene maleic anhydride resin Into a one liter resin kettle equipped as previously described was placed 202 gms. (1 mole equivalent) of a styrene-maleic anhydride resin having a molecular weight in the range of 600–750, and a styrene-maleic anhydride ratio of 1:1, 188 gms. (0.75 mole) of commercial hexadecylamine, and 4.9 gms. of mineral lubricating oil. The mixture was heated to 210° C. until the water of reaction commenced to collect in the Dean Stark trap, at which time 47.2 gms. (0.25 mole) of tetraethylene pentamine was added dropwise over a period of ten minutes. The mixture was heated an additional 3 hours at 210° C. The product was clear, dark brown, viscous liquid, which was completely soluble in the lubricating oil of Example I and organic solvents, although a slight haze was present in mineral oil at low concentrations. The properties displayed by this product in a lubricating oil are shown in Table I, under 1439–58.

EXAMPLE III

Preparation of mixed octadecylamine and tetraethylenepentamine derivative of styrene-maleic anhydride resin Into a one liter resin kettle equipped as previously described was placed 202 gms. (1 mole equivalent) of styrene-maleic anhydride resin having a molecular weight of 600–750 and a styrene-maleic anhydride mole ratio of 1:1, and 202 gms. (0.75 mole) of octadecylamine. The mixture was heated to 210° C. until the water of reaction commenced to collect in the Dean Stark trap, at which time 47.2 gms. (0.25 mole) of tetraethylenepentamine was added dropwise over a period of ten minutes. The mixture was heated an additional 3 hours at 210° C. The product was light, yellow colored, viscous liquid, which was completely soluble in 95 VI mineral lubricating oil and organic solvents. The properties displayed by this The data show that the reaction products of the invention are dispersants and possess the added advantage of exhibiting pour depressant properties and, in some cases, viscosity index improving properties. The additives also provided the base oil with excellent basicity and improved antioxidant properties. These types of improvements in the base oil can also be obtained by adding 2% by weight of the additive prepared in Example IV to the same base oil.

EXAMPLE IV

Various amounts of the reaction products of Examples I to III were incorporated into a lubricating base oil. The physical properties of the resulting blends and neat base oil are shown in the table below. In addition the blend samples were subjected to a Carbon Black Suspension Test to determine their dispersancy properties. In the Carbon Black Suspension Test a homogenized mixture of carbon black (0.1%), 25 mls. of kerosene and 25 mls. of the base oil containing the various concentrations of additives was heated at 150° C. for 16 hours and rated according to the following scale:

(1) Complete separation of carbon black.
(2) Partial separation of carbon black.
(3) Very slight separation of carbon black.
(4) No separation of carbon black.

The results showed that the reaction products of the invention are dispersants and possess the added advantage of exhibiting pour depressant properties and, in some cases, viscosity index improving properties. The additives also provide the base oil with excellent basicity and improved antioxidant properties.

It is claimed:

1. A lubricating oil-soluble reaction product prepared at a temperature of about 125 to 350° C. of:
   (A) monoamine having the formula:

wherein R is monovalent hydrocarbon of up to about 1000 carbon atoms and R' is selected from the group consisting of R and hydrogen,
   (B) polyamine having the formula:

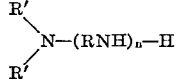

wherein R is alkylene of 2 to 25 carbon atoms, R' is selected from the group consisting of H and hydrocarbon of 1 to about 25 carbons, and $n$ is a number of 1 to 10,000, and
   (C) polymer resin of styrene and maleic anhydride in mole ratio of styrene to maleic anhydride of about 1 to 4:1, A and B being present in a total amount of about 0.1 to 2 moles per anhydride unit in C, the molar ratio of A:B being about 0.1 to 10:1.

2. The lubricating oil-soluble reaction product of claim 1 wherein the polymer resin C has an average molecular weight of about 400 to 10,000.

3. A lubricating oil-soluble reaction product of:
   (A) octadecylamine, (B) tetraethylenepentamine, and
(C) polymer resin of styrene and maleic anhydride in a mole ratio of styrene to maleic anhydride of about 1 to 4:1, A and B being present in a total amount of about 0.1 to 2 moles per anhydride unit in C and the molar ratio of A:B being about 0.1 to 10:1.

4. The lubricating oil-soluble reaction product of claim 2 wherein R of monoamine A has 5 to 25 carbon atoms and is a saturated aliphatic hydrocarbon, R of polyamine B has 2 to 4 carbon atoms, $n$ of polyamine B is 2 to 10, and R' of polyamine B is hydrogen or alkyl of 1 to about 25 carbon atoms.

5. The lubricating oil-soluble reaction product of claim 4 wherein the molar ratio of A to B is about 0.1 to 1:1.

6. The lubricating oil-soluble reaction product of claim 5 wherein monoamine A is selected from the group consisting of octadecylamine and hexadecylamine and polyamine B is selected from the group consisting of diethylaminopropylamine, diethylenetriamine and tetraethylenepentamine.

References Cited

UNITED STATES PATENTS 2,698,316  12/1954  Giammaria.
3,048,544  8/1962  Stewart et al.

JOSEPH L. SCHAFER, *Primary Examiner.*

J. KIGHT, *Assistant Examiner.*

U.S. Cl. X.R.

252—51.5